Oct. 8, 1940.                G. HAGEDORN                2,217,546
                       ELECTRIC RESISTANCE WELDING
                  Filed Sept. 28, 1938        3 Sheets-Sheet 1
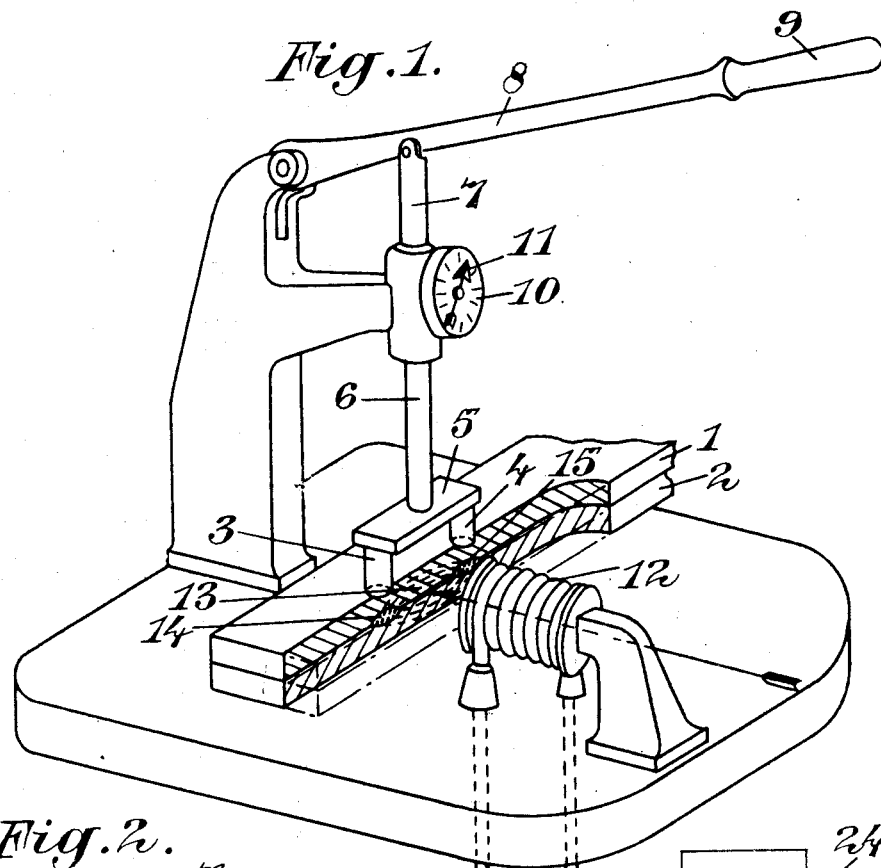
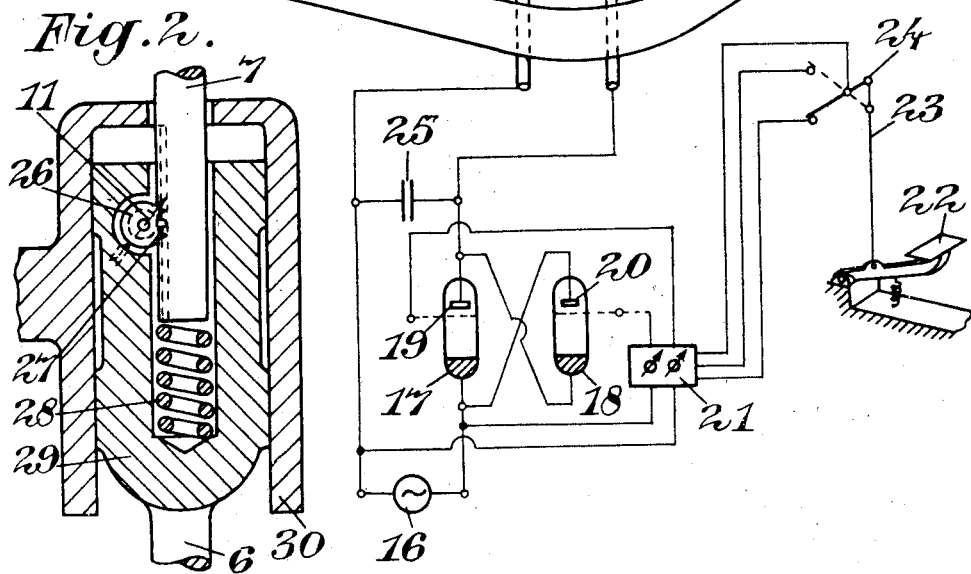
G. Hagedorn, Inventor

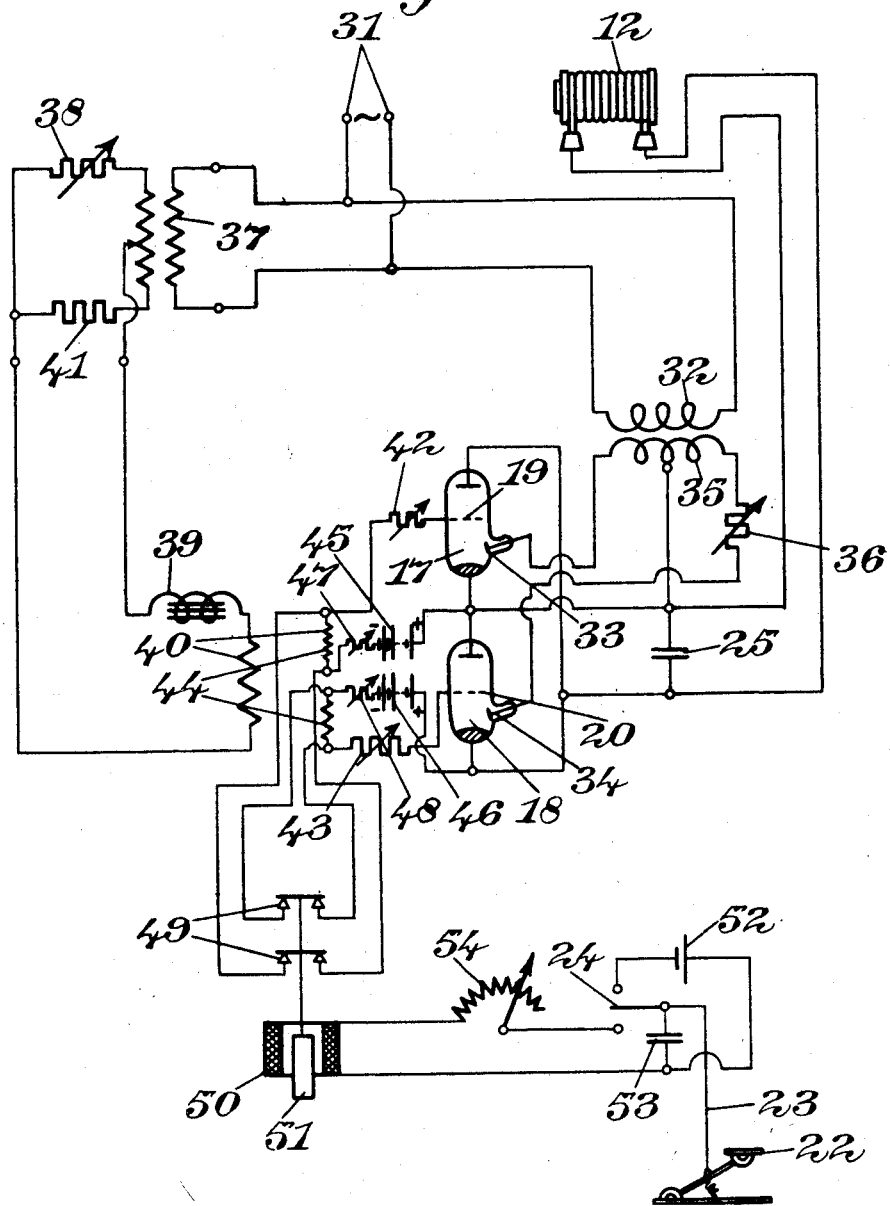

Oct. 8, 1940.   G. HAGEDORN   2,217,546
ELECTRIC RESISTANCE WELDING
Filed Sept. 28, 1938   3 Sheets-Sheet 3

G. Hagedorn
Inventor

By: Glascock Downing &Seebold
Attys.

Patented Oct. 8, 1940

2,217,546

UNITED STATES PATENT OFFICE 2,217,546

ELECTRIC RESISTANCE WELDING

Gerhard Hagedorn, Berlin-Halensee, Germany, assignor to Bernhard Berghaus, Berlin-Lankwitz, Germany Application September 28, 1938, Serial No. 232,195
In Germany October 9, 1937

4 Claims. (Cl. 219—10)

The present invention relates to a method of electric resistance spot welding and more particularly pertains to such welding wherein circulating currents are induced in superimposed parts of the material to be welded together.

In carrying out the invention eddy currents are induced in the material to be welded and such currents are produced by a coil arranged between the points to be welded and alternating current having a frequency of about 300 to 20,000 cycles is supplied to the coil for short periods of less than one second down to about one-thousandth of a second. Pressure is applied to the material to be welded together by means of nonconductors or pressure pins which carry no current. The pressure is preferably transmitted by two or more neutral pressure pins from a pressure transmitter to the work to be welded. The current transitions which are point-like or have a small surface between the parts to be welded together, for instance, two metal sheets, may be favourably influenced by the impression of indentations or by the insertion of metal layers having a small surface. Use is preferably made of frequencies which lie beyond the normal network frequency of 50 or 60, preferably 300 to 20,000 cycles per second, short periods of welding, which lie below one second down to about 1/1000 of a second being employed.

The invention is illustrated diagrammatically, and by way of example, in the accompanying drawings, in which Fig. 1 is a partial section of the whole apparatus for electric resistance spot welding, more particularly double spot welding without electrodes with magnet coil and control of the welding time;

Fig. 2 is a section through the welding pressure indicating device according to Fig. 1;

Fig. 3 is a diagram of connections of a device controlling the period of welding;

Figure 4:
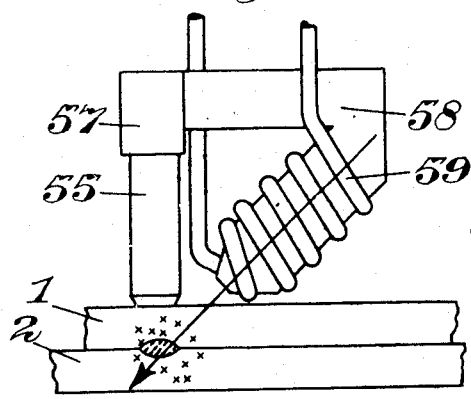
Fig. 4 is an elevational view of a device with another arrangement of the magnet coil.

Referring to Fig. 1 which shows a partial section of the whole of the apparatus for electric resistance spot welding, more particularly double spot welding without electrodes with magnet coil and control of the welding period, I and 2 are the two metal sheets to be welded together, which are shown cut out in the plane of the welding points in order to illustrate the operations in this plane. On the metal sheets to be welded together there are placed two pressure pins 3 and 4, which are electrically neutral and are arranged a certain distance apart. The pressure pins are, for instance, secured to a plate 5, which is, in its turn, connected to a plunger 6 the upper part 7 of which is connected to a lever 8 provided with a handle 9, which the welding operator grips to produce the desired pressure, read on the pressure gauge 10 by means of the indicator 11.

By exerting the point-like pressure by means of the two pressure pins 3 and 4, two point-like zones of small transition resistance are produced between the two metal sheets underneath the pins. The transition resistance between the two metal sheets is indirectly proportional to the pressure with which they are pressed against one another. The alternating magnetic field produced by means of the magnet coil 12 fed by an alternating current generates eddy currents or circular currents 13 in the two metal sheets I and 2 to be welded together, which follow a closed circuit through the upper metal sheet 1, the one pressure point, the lower metal sheet 2, the other pressure point, and back to the upper metal sheet 1. These circular currents flow through the point-like zones of small transition resistance, producing two welding spots 14 and 15 at these places. The arrangement shown is especially suitable for the production of welding spots which are not too far removed from the edges of the metal sheets. The magnet coil 12 is controlled from the source of alternating current 16 over a switching device consisting, for instance, of switching vessels 17, 18. 19 and 20 are two controlling grids in the switching vessels, which are controlled by the mechanical or electrical control impulse transmitter 21. The control is effected by means of the pedal switch 22, which is connected by means of a rod 23 with the switch 24. 25 is a condenser which serves to compensate the idle current.

Referring to Figure 2, which shows a section through the welding pressure indicating device according to Fig. 1, 11 is the indicator connected to a gear wheel 26 which engages in teeth 27 provided in the upper part 7 of the pressing plunger. The upper part of the pressing plunger rests on a spring 28, which, in its turn, is mounted in the part of the pressing plunger 6 constructed as a bearing 29, which bearing slides in a casing 30, preferably made cylindrical.

Referring to Fig. 3, which shows a diagram of connections of an arrangement for controlling the welding period, 12 is a magnet coil supplied with alternating current and through the alternating magnetic field of which the eddy currents used for the welding are produced in the work piece. 17 and 18 are the two switching tubes with the grids 19 and 20. 25 is a condenser which serves to compensate the idle current. The excitation transformer 32, which serves for the feeding of the continuously working auxiliary arcs on the auxiliary ignition devices 33 and 34, is supplied with current from the alternating current network 31. 35 is the secondary coil of the transformer and 36 is an adjustable resistance in the excitation circuit. Further, a controlling transformer 40 is fed with current from the alternating current network 31 over a transformer 37 and an adjustable resistance 38, which serves for phase displacement, and a saturated choking coil 39. 41 is a resistance, 42 and 43 are adjustable resistances which are connected to the grids, and 44 are the secondary windings of the transformer 40. 45 and 46 are voltage bias batteries, which supply the stopping voltage, and 47 and 48 are adjustable resistances. 49 is a short circuiting switch for the controlling transformer, which, by means of a relay consisting of a magnet coil 50 and an iron core 51, is drawn into the magnet coil 50, when current flows through the latter and thereby opens the short circuiting switch of the controlling transformer. 22 is the pedal switch mentioned in connection with Fig. 1, which is connected to a switch 24 through a rod 23. 52 is a battery for charging the condenser 53, which may be discharged through an adjustable resistance 54 and the magnet coil 50. The time switch thus consists of a relay 50, 51 and timing means, which is constituted by a condenser and an adjustable resistance. By regulating the resistance 54 any desired short adjustment of the period of welding is rendered possible.

In the method according to the invention it is an advantage to make the time of the flow of current as short as possible, firstly, because the welding is then better from a metallurgical point of view, and, secondly, because the heat losses are smaller. Further, according to the invention it is an advantage to use an alternating current which has a periodicity greater than the usual network frequency of 50 or 60 periods. Thus, for instance, use is made of middle or high frequencies, preferably of 300 to 20,000 cycles per second. In this way, it is possible to concentrate more energy on a smaller space, and in addition thereto a comparatively small capacity is then sufficient for the compensation of the idle power.

The eddy currents, which are otherwise produced by the field in the metal sheets, effect an additional moderate heating of the immediate surrounding of the welding zones, which is of advantage in so far as welding cracks and mechanical tensions do not then so easily arise in the material. By dispensing with the welding electrodes connected to a transformer all their disadvantages and difficulties, such as cooling, good contact, careful subsequent treatment, damage to the surface of the metal sheets are avoided in the improved spot welding method.

Figure 5:
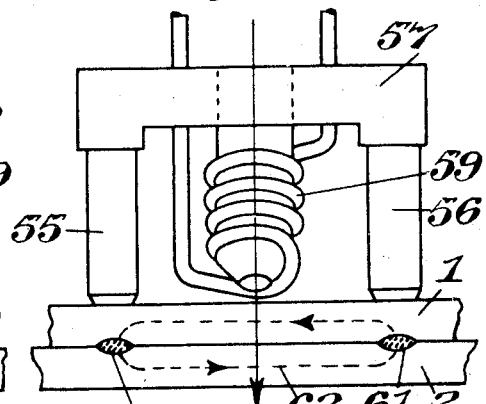
Fig. 5 is a side view of the device according to Fig. 4.

Referring to Figs. 4 and 5, which show a double spot welding device with a modified arrangement of the magnet coil, 1 and 2 are the metal sheets to be welded together, 55 and 56 are the pressure pins arranged on the pressure member 57, which has, for instance, a projection 58 on which the magnet coil 59 rests. 60 and 61 are the two welding spots and 62 indicates the path of the circulating current. The magnet coil in this arrangement is moved out towards the top out of the plane of the metal sheet and forms an angle therewith. The inclination of the axis of the coil with respect to the plane of the metal sheets is required and is an advantage, since the magnetic lines of force are at right-angles to the surfaces of the circular currents induced in the metal sheets and the planes of the paths of current should be as much as possible at right-angles to the surface.

Figure 6:
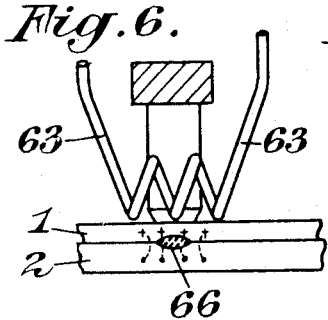
Fig. 6 illustrates a further arrangement of the magnet coil for double spot welding without electrodes.
Figure 7:
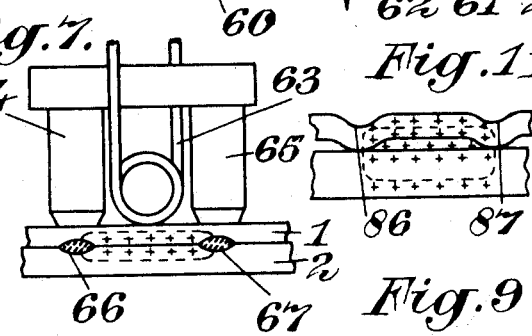
Fig. 7 is a side view of the device according to Fig. 6.

As shown in Figs. 6 and 7 the magnet coil may be also arranged as a solenoid 63, with its axis in the direction of the plane of the metal sheets, between the two pressure pins 64 and 65. 1 and 2 are the two metal sheets and 66 and 67 the two welding spots.

Figure 8:
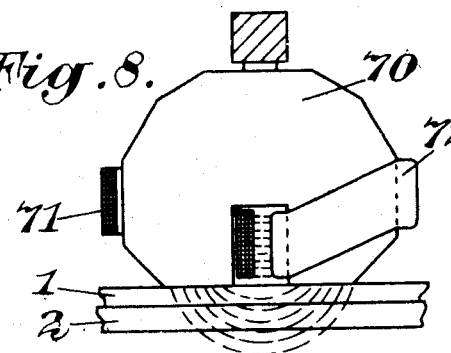
Fig. 8 illustrates a further arrangement for double spot welding without electrodes, in which use is made of one electro-magnet.
Figure 9:
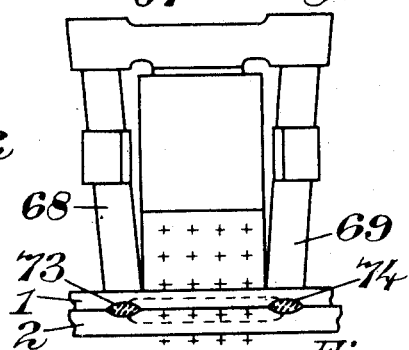
Fig. 9 is an elevational view of the arrangement shown in Fig. 8.

Further, as shown in Figs. 8 and 9, use may be made of a magnetic circuit, which is partly ironclad. 1 and 2 are in this case the metal sheets to be welded together, 68 and 69 are the pressure pins, 70 is a laminated iron core, 71 and 72 are the field coils of the magnets and 73 and 74 are the welding spots.

Figure 10:
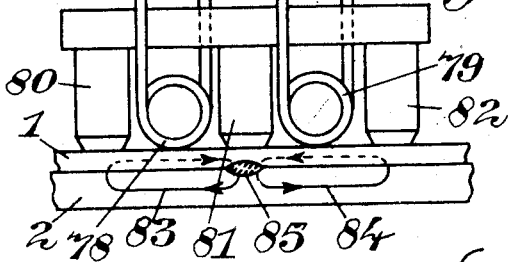

Further, in the case of the herein described double spot welding apparatus only one single spot may be produced, if one of the two pressure pins is provided with a substantially larger contact surface than the other one. Since the magnetic field intensity is limited and the value of the magnetic flux is dependent upon the existing thickness of the metal sheets, the induced voltage and thus also the welding current, is limited. If in the case of very thick metal sheets, the output is not sufficient, according to the invention two or more circuits are connected in parallel on the secondary side. This is effected, as is shown by Figure 10, for instance, by the arrangement of two coils 78 and 79 and three pressure pins 80, 81, 82. In this way, there is produced in the metal sheets 1 and 2 to be welded together two circular currents 83 and 84, which produce a single welding spot 85. This multiplication may be correspondingly carried out with the other arrangements which have been described. Further, three or more such devices may be placed one next to the other.

Figure 11:
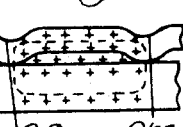
Fig. 10 is an elevational view of a further arrangement for single spot welding without electrodes and Fig. 11 shows a double spot welding arrangement without electrodes applied to metal sheets with indentations.

As shown in Fig. 11 it is especially advantageous for the method according to the present invention to press in indentations or bulges 86, 87 in the one metal sheet 1. In this way, more especially when the material is not yet softened, the path of the current is determined more definitely and, moreover, the surface enclosed by the current paths is increased, so that the flux, the voltage and the power are greater.

The improved method is also suitable for seam welding and the seam may be produced by causing lapped or not lapped spots to follow one another.

What I claim is:

1. The method of spot welding which comprises, arranging a metal sheet over another metal sheet, applying pressure to the sheets at two points to provide lower resistance between the sheets at the points where the pressure is applied than the resistance between the sheets laterally of said points, applying an alternating magnetic field to said sheets between said points so as to produce eddy currents which flow along one sheet to one of said points and then pass to the other sheet and flow therealong to the other point before passing again to the first sheet whereby the current passing from one sheet to the other is concentrated at said points to provide spot welds.

2. The method of spot welding which comprises, arranging a metal sheet over another metal sheet, applying pressure to the sheets at two points to provide lower resistance paths between the sheets at the points where the pressure is applied than the resistance between the sheets laterally of said points, applying an alternating magnetic field to both of said sheets between said points with the axis of the magnetic field arranged substantially at right angles to a line extending through said points so as to produce eddy currents which flow along one sheet to one of said points and then pass to the other sheet and flow therealong to the other point before passing to the first sheet whereby the current flowing from one sheet to the other is concentrated in said lower resistance paths to weld the sheets together immediately under the points where the pressure is applied.

3. The method of spot welding which comprises, arranging a metal sheet having spaced projections extending from a face thereof over another metal sheet, applying pressure at two points defined by the projections to provide lower resistance between the sheets at the points where the pressure is applied than the resistance between the sheets laterally of said points, applying an alternating magnetic field to said sheets between said points so as to produce eddy currents which flow along one sheet to one of said points and then pass to the other sheet and flow therealong to the other point before passing again to the first sheet whereby the current passing from one sheet to the other is concentrated at said points to provide spot welds.

4. The method of spot welding which comprises, arranging a metal sheet over another metal sheet, applying pressure to the sheets at two points to provide lower resistance paths between the sheets at the points where the pressure is applied than the resistance between the sheets laterally of said points, applying an alternating magnetic field to both of said sheets between said points with the axis of the magnetic field arranged substantially at right angles to a line extending through said points and with the axis of the magnetic field arranged in the contacting plane of the two sheets between said points so as to produce eddy currents which flow along one sheet to one of said points and then pass to the other sheet and flow therealong to the other point before passing to the first sheet whereby the current flowing from one sheet to the other is concentrated in said lower resistance paths to weld the sheets together immediately under the points where the pressure is applied.

GERHARD HAGEDORN.